United States Patent
Roever et al.

(10) Patent No.: US 10,643,253 B2
(45) Date of Patent: May 5, 2020

(54) MULTI-PROTOCOL INTERACTIVE MOBILE VIDEO ADVERTISING

(71) Applicant: Oath Inc., New York, NY (US)

(72) Inventors: Amanda Roever, San Francisco, CA (US); Richard William Collins, Pledmont, CA (US); Daniel Lachman Roosevelt, San Francisco, CA (US)

(73) Assignee: Oath Inc., New York, NY (US)

( * ) Notice: Subject to any disclaimer, the term of this patent is extended or adjusted under 35 U.S.C. 154(b) by 221 days.

(21) Appl. No.: 14/522,470

(22) Filed: Oct. 23, 2014

(65) Prior Publication Data

US 2015/0120470 A1    Apr. 30, 2015

Related U.S. Application Data

(60) Provisional application No. 61/895,400, filed on Oct. 24, 2013.

(51) Int. Cl.
*G06Q 30/02*    (2012.01)

(52) U.S. Cl.
CPC ..... *G06Q 30/0277* (2013.01); *G06Q 30/0267* (2013.01)

(58) Field of Classification Search
CPC combination set(s) only.
See application file for complete search history.

(56) References Cited

U.S. PATENT DOCUMENTS

| | | | |
|---|---|---|---|
| 7,346,855 B2 | 3/2008 | Hellyar et al. | |
| 8,281,332 B2 * | 10/2012 | Rajaraman | G06Q 30/02 705/14.4 |
| 8,494,907 B2 * | 7/2013 | Lerman | G06Q 30/02 705/14.73 |
| 2008/0109844 A1 | 5/2008 | Baldeschwieler et al. | |
| 2008/0148298 A1 | 6/2008 | Chatterjee et al. | |
| 2008/0216112 A1 | 9/2008 | Pierre et al. | |
| 2009/0013333 A1 | 1/2009 | Need | |
| 2012/0047337 A1 | 2/2012 | Grusy et al. | |
| 2012/0054777 A1 * | 3/2012 | Xiques | G06Q 30/0277 719/318 |
| 2012/0278183 A1 * | 11/2012 | Fortuna | G06Q 30/02 705/14.72 |
| 2013/0219426 A1 * | 8/2013 | Zweig | H04N 21/41407 725/32 |
| 2013/0254806 A1 | 9/2013 | Alam et al. | |

OTHER PUBLICATIONS

Michael Tuminello, Multi-Screen Video Advertising: The Standards We Have, The Standards We Need, Aug. 2, 2013, VidBlog (Year: 2013).*

(Continued)

*Primary Examiner* — Colleen A Hoar
(74) *Attorney, Agent, or Firm* — Cooper Legal Group, LLC (57) ABSTRACT

Techniques are provided for playback and event reporting of video advertisements on a user device. Two different event reporting protocols are simultaneously supported to enable application-based playback of video advertisements while collecting event information associated with the video playback. In some configurations, initialization of the event reporting protocols is serialized to avoid conflict conditions during the video playback.

14 Claims, 6 Drawing Sheets

(56) References Cited

OTHER PUBLICATIONS

The International Search Report and The Written Opinion issued in PCT/US14/62242 dated Jan. 29, 2015 (9 pgs).
"Mobile Rich-media Ad Interface Definitions (MRAID) v. 2.0", Interactive Advertising Bureau, Apr. 16, 2013 (49 pgs).
"Video Player-Ad Interface Definition (VPAID)", Version 2.0, Apr. 10, 2012, 58 pages.
"Mobile Rich-media Ad Interface Definitions (MRAID)", Version 1.0, Oct. 20, 2011, 50 pages.

* cited by examiner

MULTI-PROTOCOL INTERACTIVE MOBILE VIDEO ADVERTISING

PRIORITY CLAIM AND RELATED PATENT APPLICATION

This application claims priority of U.S. Provisional Application No. 61/895,400 entitled "Multi-Protocol Interactive Mobile Video Advertising" and filed on Oct. 24, 2013. The entire disclosure of the above application is incorporated by reference herein.

TECHNICAL FIELD

The present disclosure generally relates to video advertisements on a mobile platform.

BACKGROUND

Online advertisers pay for the opportunity to display their ads to online users. Many online information providers, such as web site operators, generate revenue by placing advertisements on their web pages accessed by online users. Online advertisements can be in various forms, including banners of text or graphics placed within the web page being displayed to a user. In recent years, multimedia ads, including digital video segments, have been gaining popularity in online advertising. Video is often a compelling medium to communicate a commercial message more forcefully. Online video advertising tends to be resource intensive and, as such, advertisers have to pay more money for placing video advertisements. Users may receive and watch the advertisements using devices of differing screen sizes and computational capabilities.

SUMMARY

The present document provides techniques for providing playback and event reporting of video advertisements on a user device. Two different event reporting protocols are simultaneously supported to enable application-based playback of video advertisements while collecting event information associated with the video playback. In some configurations, initialization of the event reporting protocols is serialized to avoid conflict conditions during the video playback.

In one exemplary aspect, techniques for presenting video advertisements on a user device include receiving an ad creative and a video ad defined by the ad creative, and playing the video ad by initializing a first event tracking protocol for interfacing with an application within which the video ad is being served and selectively initializing a second event tracking protocol for interfacing with a video player application used for in-line playing of the video ad.

In another exemplary aspect, a method of collecting and reporting information about playback of an interactive video advertisement on a mobile device includes launching a mobile app in a main webview, receiving, within a context of the mobile app, an ad creative that includes metadata and commands related to the interactive video advertisement, receiving content data for the interactive video advertisement, and launching an application programmers interface (API) comprising commands to control and monitor interaction between the interactive video advertisement and the mobile app. The API includes a first command to open an external webview during playback of the interactive video advertisement in the main webview and wherein the API further includes an isFocused command for monitoring switching between the external webview and the main webview.

These, and other, aspects are disclosed in greater detail in detailed description below, with reference to the drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide an understanding of the features in the present disclosure. The specific examples or embodiments of the present disclosure may be practiced without some of these specific details. In other instances, certain well-known structures and techniques may have not been shown or described in detail and are part of the present disclosure.

Video advertisements are delivered to, and played back by, a variety of online devices using a variety of playback techniques. An online device may be a mobile device, e.g., a smartphone, a tablet device, a wristwatch, and so on. Other online devices include network appliances, laptops, desktop computers, etc.

When a user is online and access the internet or the World Wide Web, video advertisements may be displayed to the user in a video player. The video player may be in the form of a plug-in that works within the boundaries of a web browser (e.g., Internet Explorer by Microsoft or Chrome by Google or Safari by Apple). The video player may be a standalone application that is launched by the web browser (e.g., Apple QuickTime, Microsoft Windows Media Player, etc.). In general, the user interaction with video advertisements, and reporting thereof to advertisers, has a different workflow and follows a different application.

MRAID (Mobile Rich-media Ad Interface Definitions) defines a common API for in-app mobile rich media, e.g., when a video advertisement is played back during ongoing execution of a software application (app) such as a mobile app. The current MRAID standard allows ad creatives to interact with the native elements of a mobile device (e.g., touch panel, shake and vibrate sensor, etc.). However, while MRAID supports basic video elements, the standard does not define how to communicate inline behaviors, including video progress, to publishers or intermediaries for tracking purposes.

In addition to tracking, the MRAID standard does not fully address all the aspects of mobile video including autostart support, clickthrough behavior, or the option for non-skippable video ads.

MRAID is designed to handle the interaction between an ad creative and the mobile environment into which it is served. Publishers and intermediaries have visibility into any of the events that require the ad to interact with external controls. However any events that take place within the control of the creative itself, such as video progress and interaction, are not exposed to the publisher or intermediaries and cannot be tracked.

Conversely, VPAID (Video Player-Ad Interface Definition) is specifically designed to address the interaction between a video creative and a player including an extensive communication around tracking video progress and state of the video. However, the VPAID standard does not support the range of interactions possible between mobile apps and rich media. This limitation is highlighted in the VPAID 2.0 specification.

VPAID was designed to work across multiple platforms, many of which include various mobile devices. However, VPAID interactions are limited where specific mobile interactions apply. For example, VPAID isn't designed to track use of the accelerometer in mobile devices such as when the user "shakes" the mobile device to play a song or initiate some other action.

Neither MRAID nor VPAID alone currently supports an interactive mobile video unit that can take advantage of the full extent of mobile rich media elements while still allowing publishers and intermediaries insight into the inline video behavior.

Visibility into video behavior and tracking events is the primary gap affecting partners working with interactive video in mobile. We would like to propose a standard method to define the interaction between the MRAID and VPAID standards to resolve this issue for the mobile video ad industry at large.

Techniques disclosed in the present document can be used to address the above discussed limitations of the current protocols, among other problems. In one aspect, interactions between the MRAID and VPAID APIs to provide more extensive support for interactive video in mobile apps are disclosed. In one advantageous aspect, incorporating the VPAID Javascript API framework as part of MRAID video creatives provides a consistent method for ad units to raise video tracking events based on video creative behavior, which, in turn, allows SDKs and/or publishers to track those events For example, in some embodiments, both MRAID and VPAID APIs may be initialized in parallel. In some embodiments, the initializations may be sequenced so that the initialization of one API is completed only after the initialization of the other API is completed.

These, and other techniques, are disclosed in the present document. Unless otherwise noted, the terminology used in the present document is consistent with Video Player-Ad Interface Definition (VPAID) Version 2.0 Document published by IAB on Apr. 10, 2012, which is incorporated by reference in its entirety herein, and Mobile Rich-media Ad Interface Definitions (MRAID) v.1.0 document by IAB, released on Oct. 20, 2011, which is incorporated by reference in its entirety herein.

Examples of System Architecture

Figure 1:
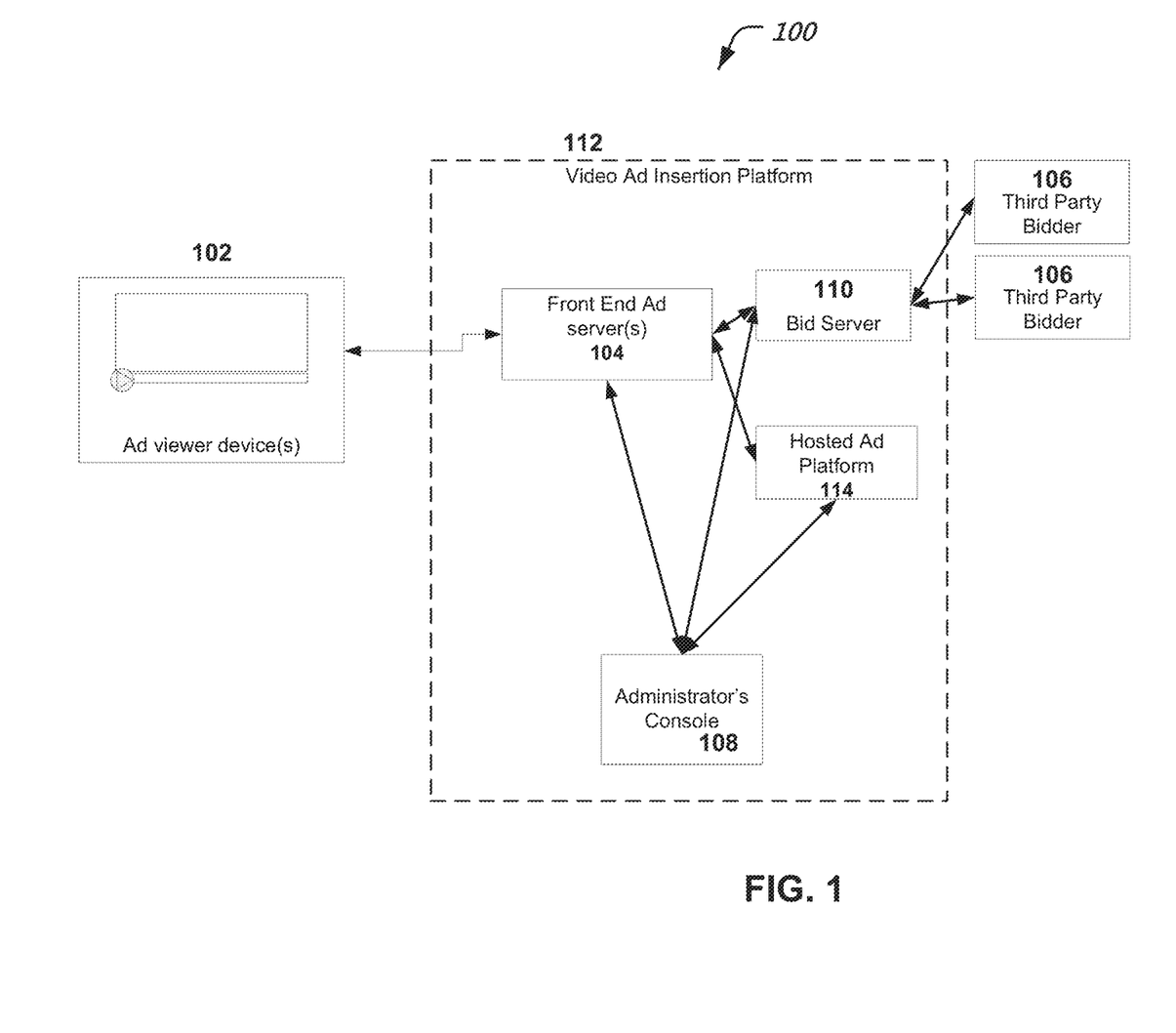
FIG. 1 illustrates an example of a high level architecture for an online video advertisement system.

FIG. 1 depicts a simplified view of example online video advertisement insertion architecture 100. An ad viewer's device 102 (e.g., a wireless or a mobile device, as discussed above) may be communicatively coupled (e.g., via the internet and a wired or wireless connection) with a front end ad server 104. In some embodiments, the front end ad server 104 (or, in short, ad server 104) may be the point of entry/exit of communication messages between viewer devices and a video ad insertion platform 112 (hence the name "front end" server). The ad server 104 may communicate bids to show video ads to the device 102 to multiple bidders 106 via a plurality of bid server platforms 110. The ad server 104 may further be in communication with a hosted ad platform 114 and exchange bid request/bid response messages for insertion of advertisements from advertisers hosted by the hosted ad platform 114. An operator console 108 may be provided to control the operation of the ad server 104 and bid servers 110. The bid servers 110 may also be sometimes called the bidding interface because these servers provide an interface between third party bidding servers and the online video advertisement service.

The ad server 104 may perform functions such as handling incoming ad requests from multiple ad viewer devices 102, and respond with an ad or a "no ad" placement. The ad server 104 may operate on a time budget, e.g., 50 to 100 msec. within which it responds to an ad request. The ad server 104 may provide ad data to the viewer device 102 using VAST (video ad serving template) format. The decision about which advertisement to be sent may be based on various factors and real time data such as publisher placement, uniform resource locator (URL), a geographic location of the viewer device, time of day, demographic segment to which the viewer belongs, and so on.

As an example, in Brightroll's system the Ad server 104 can be a Real Time Ad Server (RTAS) and the bid server 110 can be an RTB-D.

When the ad server 104 receives a video placement request from the viewer's device 102, the ad server 104 may pass on the request to multiple bid servers 110. The request may include information about the viewer, the viewer's demographic profile and other rules associated with the ad placement opportunity that may influence the selection of a winning bid.

The bid servers 110 in turn request bids from multiple third party bidders 106. In some embodiments, no explicit bid requests may be generated for the hosted ad platform 114. When bids are received from third party bidders, and/or the hosted ad platform, and/or at the end of a time period (e.g., 90 milliseconds), a decision is made about the winning bid. In some embodiments, the winning bid not only will have the highest dollar value but also should match the demographic profile of the viewer. For example, if the viewer is on the West coast, an advertisement for users on East coast may not be allowed to win bid even when the third party bidder bids the highest dollar value.

Next, the winning bidder is notified of winning the bid. The winning bidder is provided with information to allow the winning bidder to transmit a video advertisement to the viewer.

Constraints of Interactive Mobile Video Using MRAID+VPAID

For an SDK/container or an MRAID creative to be eligible to use this intersection between the MRAID and VPAID APIs, a number of constraints may be put to ensure consistent support for these video ads.

Inline and Autostart Support

In some embodiments, to allow VPAID events to be tracked for MRAID video, the SDK/container webview may support inline and autostart parameters. The video element in the ad creative may begin without user interaction and play inline. If the video is played in the native player, the ad creative may be unable to provide information on the video behavior or events.

The current MRAID standard allows the MRAID creative to interrogate the SDK/container for inline support but does not address communication around autostart support. In some disclosed embodiments, protocol support to allow the MRAID ad to query the SDK/container for inline support is provided, as disclosed with respect to the autostart feature.

Ad Impression

When a creative is using both the MRAID and VPAID APIs, the AdImpression should be counted on the VPAID AdImpression event, which should be fired as soon as the user-visible phase of the ad has begun, in accordance with the definition listed in the VPAID specification.

AdImpression

The AdImpression event may be used to notify the video player that the user-visible phase of the ad has begun. The AdImpression event may be sent using different criteria depending on the type of ad format the ad unit is implementing.

MRAID units not using the VPAID API should continue to count ad impressions following the current standard.

Additional SDK/Container Elements

To allow the ad creative studio to fully design the experience of the ad unit, the SDK/container should not overlay additional elements, such as countdown timers, 'advertisement' notifications, etc., on top of the area allotted to the creative. These additional elements can obscure the creative and block interactivity.

If an SDK/container has elements to include during the ad, these elements should be restricted to an area outside of the boundaries exposed to the ad creative for display. In response to the getCurrentPosition method and getMaxSize or any resize methods, the SDK/container should return values that exclude the area required for its additional elements.

In the current MRAID spec, the getScreenSize section includes the note that this method "will return the TOTAL size of the device screen, including area (if any) reserved by the OS for status/system bars or other functions." This is to establish it in contrast to the getMaxSize which should exclude any area required for the additional SDK/container elements.

Establishing the VPAID and MRAID Protocols

With the above constraints in mind, embodiments may be designed to simultaneously support the VPAID and MRAID APIs.

To implement these ads, the SDK/container and the ad creative may follow the initialization protocols of both standards. The steps may be taken in parallel but the VPAID initialization should be completed prior to the ad container firing the MRAID "ready" event; this allows both APIs to be fully accessible before the ad begins playing.

MRAID Initialization

1. Ad identifies itself as MRAID as early as possible by invoking MRAID script tag. <script src="mraid.js"></script>

2. SDK/MRAID-compatible Container
 a. Optionally detects the script tag
 b. Provides the MRAID JavaScript bridge for MRAID ads
 c. Provides limited MRAID object with an MRAID State="loading" and the ability to query the state 3. If the ad uses createElement, waits for mraid.js to finish loading 4. If MRAID State="loading" then ad listens for "ready" event with mraid.addEventListener('ready')

5. SDK/Container finishes initializing MRAID library into the webview
 a. Changes the MRAID state to "default" and the StateChange Event is triggered b. Fires the MRAID "ready" event
 i. When the VPAID API is being used, the MRAID creative should not fire the MRAID "ready" event until the VPAID method initAd( ) has been called and the SDK/container has subscribed to the VPAID events.

6. Ad's "ready" event listener is triggered and ad JavaScript can now use the MRAID APIs 7. Ad performs support check for inline and autoplay using the support method. If both are supported, the creative should play inline and autostart. If inline is not supported, the unit would not be eligible for MRAID+VPAID.

8. Using the isViewable method, check the ad unit checks to see if the ad is currently viewable on screen. If it is not yet viewable, register for the viewableChange event. Once the ad is viewable, it can begin playing.

VPAID Initialization

1. As soon as the HTML document loads, the SDK/container checks for the presence of the getVPAID function. If present, it calls the function. If the getVPAID function is not present, the SDK/container can continue to play the ad unit as an MRAID creative without VPAID support or cancel the ad.

2. If the ad object is returned, then the SDK/container calls the VPAID handshakeVersion. This indicates to indicate to the ad unit that VPAID will be used. The video player passes its latest VPAID version string.

3. The ad unit returns a version string minimally set to "1.0", and of the form

"major.minor.patch" (i.e. "2.1.05").

4. If the handshake is unsuccessful, the SDK/container can continue to play the ad unit as an MRAID creative without VPAID support or cancel the ad.

5. If the handshake is successful, the SDK/container calls initAd( ) to initialize the ad experience.

6. Once the ad unit's assets are loaded, the ad unit sends the AdLoaded event to notify the SDK/container that it is ready for display.

7. Receiving the AdLoaded response indicates that the ad unit has verified that all files are ready to execute.

8. The SDK/container calls the subscribe( ) method to register a listener for the particular event(s) it's subscribing.

Standardizing the Interaction Between the VPAID and MRAID APIs

Once both standards are initialized, the ad and the SDK/container can communicate through either the VPAID or the MRAID API depending on the specific need. To prevent overlap between the standards, the interaction should support VPAID Dispatched events (VPAID 2.0, 3.3), MRAID events and methods, and a limited portion of VPAID methods and properties.

Subscribing to VPAID Events

One advantageous use of establishing both standards is to allow the SDK/container transparency into inline video behavior or progress that is not provided by the MRAID standard. By including support for VPAID events, the SDK/container can have a complete understanding of the inline video experience. Performance reporting can be more comprehensive as well as consistent with desktop interactive video ads.

Once the VPAID protocol has been established, the SDK/container can subscribe to VPAID Dispatched Events (VPAID 2.0, 3.3). When a video specific event occurs during the course of the MRAID ad display, the ad creative should dispatch the corresponding VPAID event allowing the listening SDK/container to be aware of the event and to take appropriate action.

For example, when the user-visible phase of the video ad begins, the ad creative dispatches the corresponding VPAID event, AdImpression. When the SDK/container receives this event, it knows that the video is now visible to the user and it can fire a VAST impression event pixel to track that event in reporting, as illustrated below.

MRAID Event Tracking

The MRAID events are dispatched from the SDK/container to the ad unit to provide information about the ad space. The ad creative can continue to subscribe to MRAID events (listed below) by using the MRAID addEventListener method.

error
    ready
    sizeChange
    stateChange
    viewableChange
    VPAID Event Tracking The VPAID events are dispatched from the ad unit to the SDK/container to provide information about the video element behavior. The SDK/container can subscribe to VPAID events by using the VPAID subscribe( ) method. The events could be:

AdLoaded
    AdSkipped
    AdStarted
    AdStopped
    AdLinearChange
    AdExpandedChange
    AdRemainingTimeChange
    AdVolumeChange
    AdImpression
    AdVideoStart
    AdVideoFirstQuartile
    AdVideoMidpoint
    AdVideoThirdQuartile
    AdVideoComplete
    AdClickThru
    AdInteraction
    AdUserAcceptInvitation
    AdUserMinimize
    AdUserClose
    AdPaused
    AdPlaying
    AdLog
    AdError Using this method, implementations should be able to take full advantage of the full rich media MRAID ad units without losing the valuable video progress and behavioral events that allow tracking and monetizing the video ads.

Methods and Properties

MRAID methods are typically dispatched from the ad unit to the SDK/container to provide instructions to the SDK/container when the ad needs to interact with the native device elements. To prevent conflicting instructions from the SDK/container based on VPAID methods, the supported VPAID methods may be limited to what is used to initiate the VPAID API. Other VPAID methods, such as startAD( ) and stopAd( ) need not be supported as the SDK/container and should not provide instructions to the ad creative for how it should handle the inline video ad play.

This allows the ad unit to remain in control of the overall ad experience.

MRAID Methods
    addEventListener
    createCalendarEvent
    close
    expand
    getCurrentPosition
    getDefaultPosition
    getExpandProperties
    getMaxSize
    getPlacementType
    getResizeProperties
    getScreenSize
    getState
    getVersion
    isViewable
    open
    playVideo*
    removeEventListener
    resize
    setExpandProperties
    setResizeProperties
    storePicture
    supports
    useCustomClose The playVideo method would not be used for the video element of the MRAID+VPAID creatives as this interaction requires the video to play inline.

VPAID Methods
    handshakeVersion( )
    initAd( )
    subscribe( )
    unsubscribe( )

Examples of Extensions to the MRAID Spec

In addition to the use of the VPAID API to support additional video tracking, some embodiments may extend the existing MRAID specification (Appendix C) with additional functionalities and API calls.

Currently, ad studios and publishers confirm autostart support and the clickthrough behavior outside of the MRAID standard. Additionally, the close button requirements typically do not allow flexibility for a delayed skip or close button on video ads.

Example Extensions to MRAID Events and Method Values
    skipDisplayed
    adResumed
    isFocused
    supports method( )
    autostartVideo value Autostart Support supports method: autostartVideo value MRAID does not currently address how to determine if autostart is available for the SDK/container webview. In some embodiments, MRAID may be extended to provide a means of communicating this support between the SDK/container and the ad creative. This autostartVideo value could be similar to the existing support value for inlineVideo.

TABLE 1

| Value | Description |
| --- | --- |
| sms | The device supports using the sms: protocol to send an SIMS message |
| tel | The device supports initiating calls using the tel: protocol |
| calendar | The device can create a calendar entry |
| storePicture | The device supports the MRAID storePicture method |
| inlineVideo | The device can playback HTML5 video files using the <video> tag and honors the size (width and height) specified in the video tag. This does not require the video to be played in full screen. |
| autostartVideo | The device can playback HTML5 video files without requiring user interaction. |

In order to enable inline video playback and autoplay of video, MRAID compliant SDKs should consistently insert the any necessary enabling tags into the webview depending on the operating system of the device.

For embodiments using iOS operating system, the autostart value can be set for iOS devices, the following tags may be used:

```
webView.mediaPlaybackRequiresUserAction = NO;
webView.allowsInlineMediaPlayback = YES;AB Mobile Rich-media Ad
```

Autoplay is not currently referenced under the description for Android inline support, but this section can also be expanded to describe how to enable autoplay on supported Android versions (Jelly Bean and above).

For Android (Jelly Bean and above) devices, the SDK may use webSettings to enable video to play without user interaction:

```
webView = new WebView(this); //this points to the activity
WebSettings webSettings = webView.getSettings( );
webSettings.setMediaPlaybackRequiresUserGesture(false);
```

Prior to Android 4.2, no changes may have to be done to webSettings to allow autostart support. For versions prior to Android 4.2, autostart can always be assumed. For devices earlier than Android 2.x, there is no video element so these no MRAID units including video would not be supported. If autostart is NOT supported, the ad should either be cancelled or should display a play button in the middle of the ad to allow the user to initiate video playback manually. In this case, the video impression is only fired if the user starts video playback. Video ads requiring manual playback should however be an edge case—advertisers should make sure that publisher/network ad servers target around OS versions that do not support autostart to make sure this is the case.

Clickthrough Behavior
adResumed Event

When the SDK/container opens an external webview in response to the MRAID open method, there is currently no way for the SDK/container to indicate to the creative when a user closes the second webview and returns to the first webview (a webview being, e.g., a web page). This prevents the creative from knowing when to resume any animation such as a paused video element.

Some ad designers have used the viewableChange event to communicate that the video is no longer in view and have the webview use this event to take action for the video play. The use of this method for this purpose is not in conformance with the MRAID standard.

In some embodiments, a new adResumed method may be added to the MRAID standard to communicate this return to the main webview and resolve this need.

1. On requesting the URL to display (this can either be from the main ad unit, or from within an interactive engagement slate), the ad unit should call mraid.open( ) and the SDK/container will set mraid.viewableChange(false) to indicate the webview has opened on top of the video unit.

2. Upon calling mraid.open( ) the creative should also fire VPAID adClickThru, in order for the integration layer to track the click.

3. VPAID AdPaused should fire in succession after VPAID adClickThru is fired, in order to pause the video while the user navigates the advertiser's site in the secondary webview.

4. When the second webview is closed, the SDK/container should call mraid.adResumed(true) in order to instruct the video to start again; the ad will then fire VPAID AdPlaying to resume video playback.

isFocused( ) Method, focusChange Event

In some embodiments, a function call, called isFocused( ) may be used to implement clickthrough behavior.

When the SDK/container opens an external webview in response to the MRAID open( ) method, there is no way for the SDK/container to indicate to the creative the shift from the current webview as within the users focus to the second webview. Likewise, when a user closes the second webview and returns to the first webview, there is currently no method to indicate that the user has resumed focus on the main webview. This prevents the creative from knowing when to pause any animation, such as a video element, when the user moves to a second webview and when to resume it when the user returns to the main webview.

Some ad designers have used the viewableChange event to communicate that the video is no longer in view and have the webview use this event to take action for the video play. However, this method in not in full conformance with the MRAID standard.

To achieve conformance, in some embodiments, a new isFocused( ) method may be implemented to complement the MRAID standard to communicate the behavior around the navigation to and from a second webview to resolve this gap. The parameters for this new method would be boolean, true would indicate the user could view the primary webview; false would indicate the user was in a second webview and the primary webview was no longer visible.

On requesting the URL to display (this can either be from the main ad unit, or from within an interactive engagement slate), the ad unit should call mraid.open( ) and the SDK/container will set mraid.isFocused(false) to indicate a new webview has opened on top of the video unit.

The focusChange event fires when the ad moves from the primary webview to a second, over off-screen webview and vice versa.

Upon calling mraid.open( ) the creative should also fire VPAID adClickThru, in order for the integration layer to track the click.

If the creative elects to pause the video element when a second webview is opened on top of the primary webview, the VPAID event AdPaused should fire in succession after VPAID adClickThru is fired, in order to indicate the video was paused.

When the second webview is closed and the user if focused on the main webview again, the SDK/container should set the method mraid.isFocused(true) in order to inform the creative that the user has returned and. The creative can them resume any paused animation, such as the video element. The ad should then fire VPAID AdPlaying event to indicate that it has resumed video playback.

Skip/Close Button Behavior skipDisplayed Event

The MRAID stand calls for a close indicator to be present throughout the ad experience allowing the user to exit the ad at any time. While this makes sense for standard display ad units, video ad creatives include a temporal element. Allowing a user to skip the video immediately greatly reduces the rate of ad completion and the effectiveness of the video ad.

In some embodiments, the presence of close indicator is allowed to be delayed during the video portion of the ad to be set at the discretion of the publisher. The SDK/container should fire the proposed skipDisplayed event to inform the ad creative when the skip/close indicator becomes present during the video.

If the publisher chooses not to include a close indicator during the video ad, at the end of the video portion of the ad, the SDK/container should:

1. Automatically receive a close( ) method from the ad creative if the ad experience is completed, or 2. If there is are additional elements of the ad presented after video element, the SDK/container should include the close indicator after the ad creative fires the VPAID event AdVideoComplete.

If the creative wants to monitor for users closing the webview via the SDK/container's close button, the ad should check for a stateChange event and call the getState method to detect that it is hidden.

The custom close button designed by the creative designer can be continued to be used with video method to modify the appearance of the close indicator when it's present.

Additional Requirements for Interactive Mobile Video

For a SDK/container and an MRAID creative to be eligible to use this intersection between the MRAID and VPAID APIs, a few constraints are required to ensure consistent support.

Inline Video Playback and Autostart Must be Supported

To support the optimal interactive video experience, the SDK/container webview must support inline video and autostart video. The video element in the ad creative should be able to start without user interaction and play inline.

The current MRAID standard allows the MRAID creative to interrogate the SDK/container for inline support but does not address communication around autostart support. We recommend adding a support method value to allow the MRAID ad to query the SDK/container for autostart support. We have included more details on this proposed value in the Autostart Support technique.

Video Ad Impressions Must be Counted when Video Starts

When a creative is using both the MRAID and VPAID APIs, the AdImpression should be counted on the VPAID AdImpression event, which should be fired as soon as the user-visible phase of the ad has begun, in accordance with IAB video impression measurement guidelines:

A valid digital video ad impression may only be counted when an ad counter (logging server) receives and responds to an HTTP request for a tracking asset from a client. The count must happen after the initiation of the stream, post-buffering, as opposed to the linked digital video content itself.

Specifically, measurement should not occur when the buffer is initiated, rather measurement should occur when the ad itself begins to appear on the user's browser, closest to the opportunity to see.

It may be possible to run MRAID ad units that contain video that do not wait to fire the impression after the video starts, but in this case the ad units must be billed and counted as rich media ad units, not video ad units.

Additional SDK/container Elements Must Not Overlap Video Creative Area

To allow the ad creative studio to fully design the experience of the ad unit, the SDK/container should not overlay additional elements, such as countdown timers, 'advertisement' notifications, etc., on top of the area allotted to the creative. These additional elements can obscure the creative and block interactivity.

If a SDK/container has elements it needs to include during the ad, they should be restricted to an area outside of the boundaries exposed to the ad creative for display. In response to the getCurrentPosition( ) method and getMaxSize( ) or any resize( ) methods, the SDK/container should return values that exclude the area required for its additional elements.

This requirement is covered in the current MRAID spec but frequently overlooked—the getScreenSize( ) section includes the note that this method "will return the TOTAL size of the device screen, including area (if any) reserved by the OS for status/system bars or other functions." This is to establish it in contrast to the getMaxSize which should exclude any area required for the additional SDK/container elements. This requirement should be called out more clearly under the definition of getMaxSize.

Figure 2:
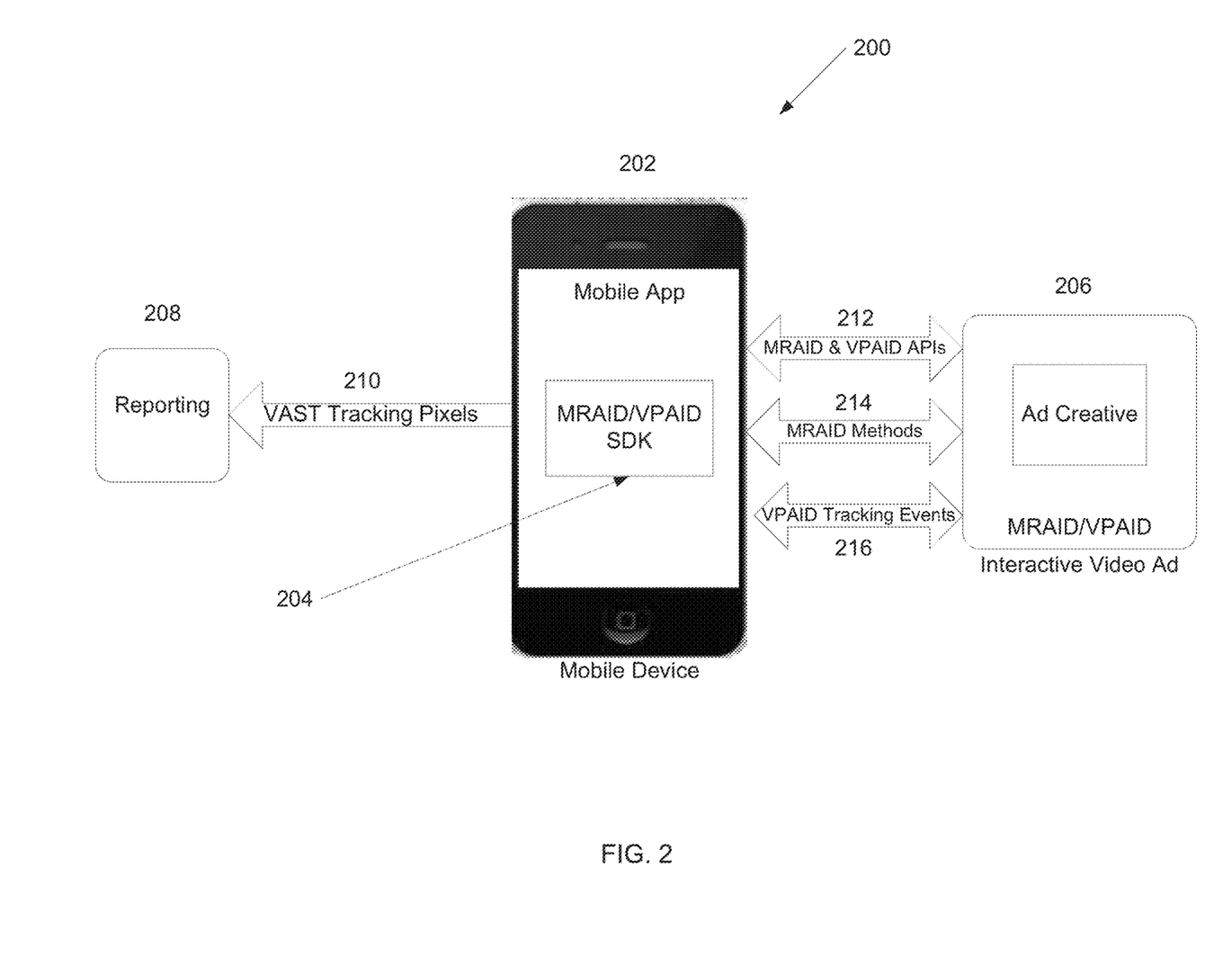
FIG. 2 shows an example block diagram of an exemplary system for displaying video advertisements on a mobile device.

In addition to providing a clear area for the creative to control without overlaying elements, the SDK/container should never include additional video controls as these may conflict with the creative controls. FIG. 2 is a block diagram of an exemplary system 200 for displaying video advertisements on a mobile device. A mobile device 202 includes a Software Developer's Kit (SDK) that may implement the features of MRAID and VPAID as disclosed in this document. MRAID and VPAID APIs may be exchanged (212) with an ad creative 206 that conveys an interactive video advertisement. The messages exchanged/APIs established with the ad creative 206 include MRAID methods (214) and VPAID tracking events (216), which may be established concurrently, as described herein. VAST tracking pixels may be used to fire reporting events that are reported (210) to a reporting module 208.

Figure 3:
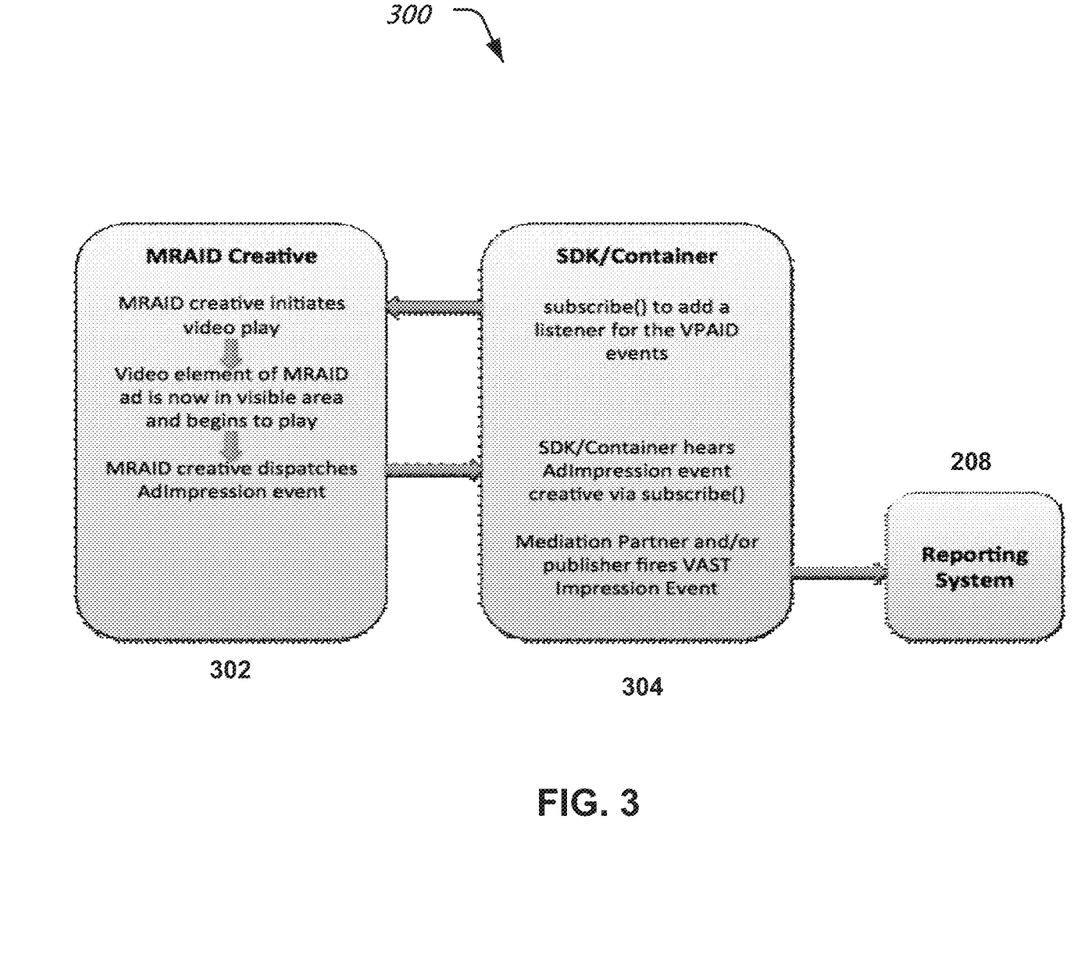
FIG. 3 shows an example block diagram description of an apparatus for playing back video advertisements on a user device.

FIG. 3 is a block diagram description of an apparatus 300 for playing back video advertisements on a user device. An MRAID creative 302 may initiate video play, making the video element of MRAID ad visible in a visible area. Once the video begins to play, MRAID creative may dispatch AdImpression events, as previously described. The SDK/container 304 may use subscribe( ) API call to add a listener for VPAID events. The SDK/container may also hear AdImpression events, reported from the MRAID creative 302, via the subscribe( ) API. In addition, the SDK may also support firing of a VAST impression event provided by an ad provider (partner). The events are reported to a reporting system 208.

Figure 4:
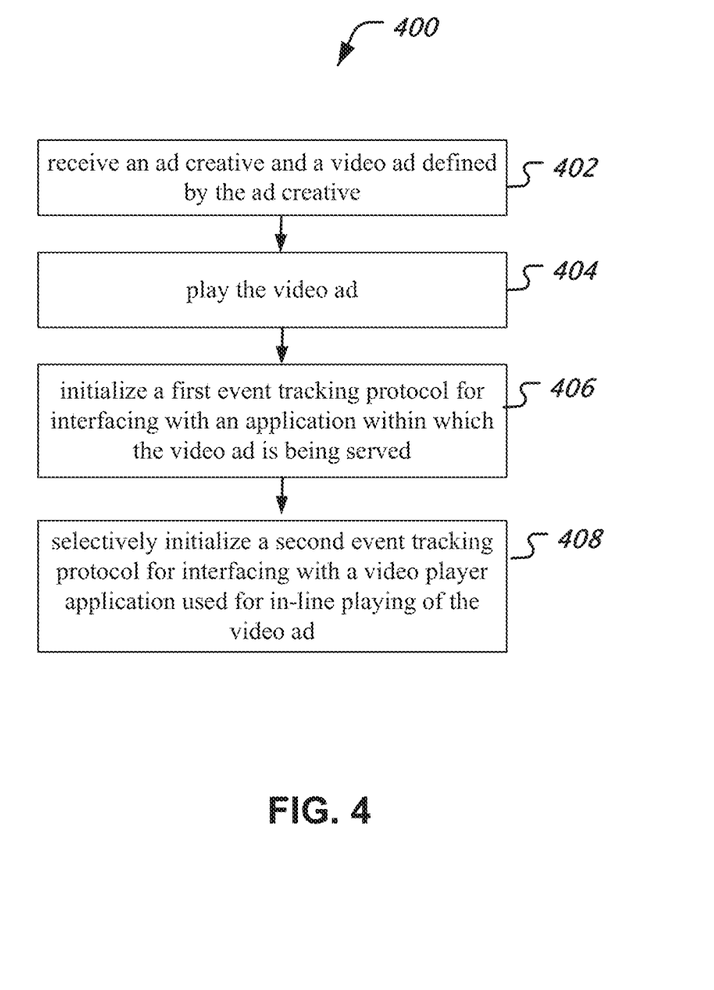
FIG. 4 shows an example flowchart representation of exemplary video advertisement monitoring process.

FIG. 4 is a flowchart representation of exemplary video advertisement monitoring process 400.

At 402, the process 400 receives an ad creative and a video ad defined by the ad creative.

At 404, the process 400 plays the video ad. The playback may occur, e.g., on a client device such as a smartphone, a tablet or a laptop.

For the playback, at 406, the process 400 initializes a first event tracking protocol for interfacing with an application within which the video ad is being served.

At 408, the process 400 selectively initializing a second event tracking protocol for interfacing with a video player application used for in-line playing of the video ad.

In some embodiments, the first event tracking protocol comprises a mobile rich media ad interface definition (MRAID) protocol.

In some embodiments, the second event tracking protocol comprises a video player ad serving interface definition (VPAID) protocol.

In some embodiments, the operation of selectively initializing the second event tracking protocol comprises initializing a subset of all functions of the second event tracking protocol due to the initializing the first event tracking protocol.

In some embodiments, the process 400 controls the initialization operation of the first event tracking protocol and the initialization operation of the second event tracking protocol such that the initialization operation of the second event tracking protocol is completed prior to completing the initialization operation of the first event tracking protocol In some embodiments the process 400 initializes the first event tracking protocol by checking a status of completion of initialization of a function call from the second event tracking protocol and refraining from indicating that the first event tracking protocol is initialized until the status indicates that initialization of the function call is complete.

In some embodiments, the process 400 checks whether the ad creative includes a function call to the second event tracking protocol, initializes the second event tracking protocol when the ad creative includes the function call, and plays the video ad without initializing the second event tracking video when the ad creative does not include the function call.

In some embodiments, the process 400 checks whether the ad creative includes a function call to the second event tracking protocol, initializes the second event tracking protocol when the ad creative includes the function call, and refrains from playing the video ad when the ad creative does not include the function call.

Figure 5:
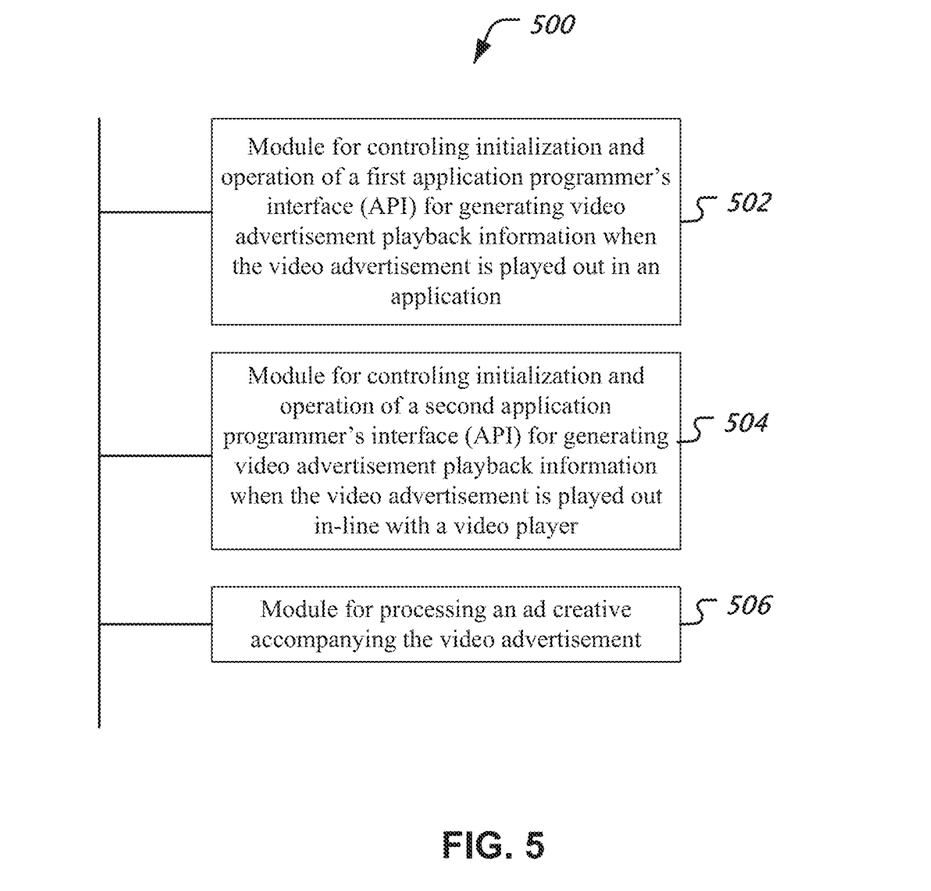
FIG. 5 is a block diagram representation of an exemplary apparatus for displaying video advertisement to an online user device.

FIG. 5 is a block diagram representation of an exemplary apparatus 500 for displaying video advertisement to an online user device. The apparatus 500 includes a module 502 that controls initialization and operation of a first application programmer's interface (API) for generating video advertisement playback information when the video advertisement is played out in an application. The module 504 controls initialization and operation of a second application programmer's interface (API) for generating video advertisement playback information when the video advertisement is played out in-line with a video player. The module 506 processes an ad creative accompanying the video advertisement.

Figure 6:
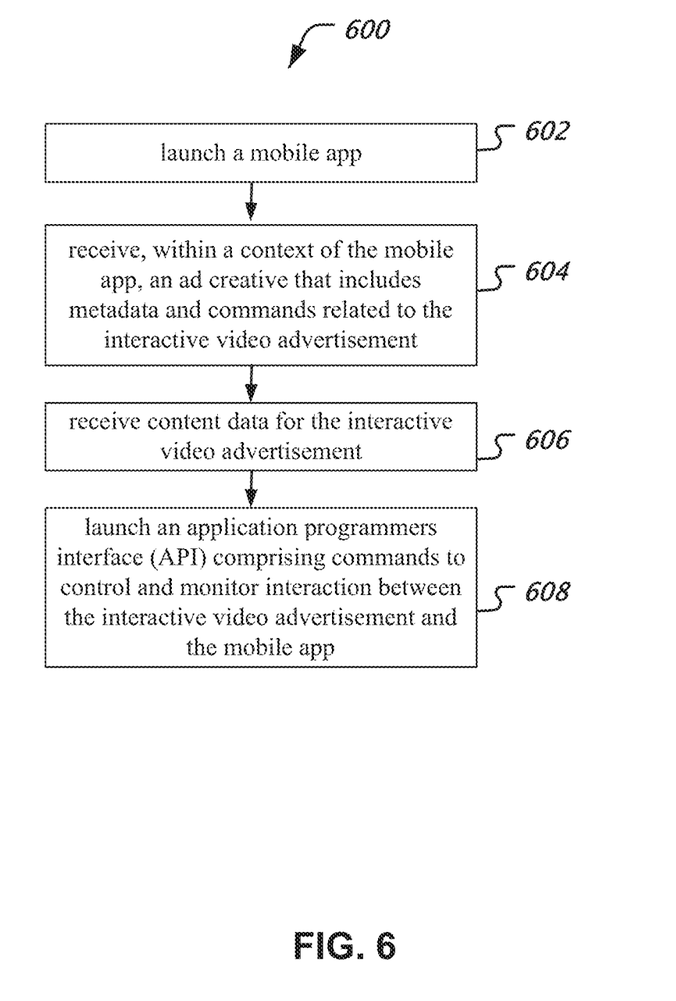
FIG. 6 shows an example flowchart of a method of collecting and reporting information about playback of an interactive video advertisement on a mobile device.

FIG. 6 is a flow chart representation of an exemplary method 600 of collecting and reporting information about playback of an interactive video advertisement on a mobile device. The method 600 may be implemented on a mobile device 202.

At 602, a mobile app is launched. The mobile app may be launched directly under user control and/or techniques disclosed in this document. At 604, within a context of the mobile app, an ad creative that includes metadata and commands related to the interactive video advertisement is received. At 606, content data for the interactive video advertisement is received. At 608, an application programmers interface (API) comprising commands to control and monitor interaction between the interactive video advertisement and the mobile app is launched.

In some embodiments, the API includes a first command to open an external webview during playback of the interactive video advertisement in the main webview and wherein the API further includes an isFocused command for monitoring switching between the external webview and the main webview.

In some embodiments, the metadata includes an autostart command that enables starting playback of the interactive video advertisement by the mobile app without user interaction.

In some embodiments, an example method of collecting and reporting information about playback of an interactive video advertisement on a mobile device includes receiving an ad creative that includes metadata and commands related to the interactive video advertisement, receiving content data for the interactive video advertisement, launching an application programmers interface (API) comprising commands to control and monitor playback of the interactive video advertisement, and notifying, to the ad creative, a skip event by which playback of the interactive video advertisement is skipped or forwarded.

It will be appreciated that techniques for communicating in parallel events for video advertisement playback on a mobile device are disclosed. In some embodiments, VPAID and MRAID APIs may be initialized for simultaneously reporting mobile video ad display events.

It will further be appreciated that, in some embodiments, VPAID initialization may be completed prior to finishing MRAID initialization. In some disclosed embodiments, an MRAID ready event is not fired until VPAID initAd( ) method is called and the SDK has subscribed to the VPAID events.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method of presenting video advertisements on a user device, comprising:
    receiving, with a processor, an ad creative and a video ad defined by the ad creative;
    playing, with the processor, the video ad by:
    initializing, with the processor, a first event tracking protocol comprising a mobile rich media ad interface definition (MRAID) protocol for interfacing with an application within which the video ad is being served; and
    selectively initializing, with the processor, a second event tracking protocol comprising a video player ad serving interface definition (VPAID) protocol for interfacing with a video player application used for in-line playing of the video ad such that the VPAID protocol finishes initialization prior to the MRAID protocol finishing initialization;
    wherein initialization of the first event tracking protocol and selective initialization of the second event tracking protocol are implemented at least in part via a Software Developer's Kit (SDK) container to (i) interact with the first event tracking protocol to track inline video behavior that the second event tracking protocol is not configured to track and (ii) interact with the second event tracking protocol to communicate the inline video behavior to a computing device, wherein the first event tracking protocol is not configured to communicate inline video behaviors; and
    transmitting information, associated with the playing, to at least one computing device.

2. The method of claim 1, wherein the selectively initializing the second event tracking protocol comprises initializing a subset of all functions of the second event tracking protocol due to the initializing the first event tracking protocol.

3. The method of claim 1, wherein the initializing the first event tracking protocol comprises:
    checking a status of completion of initialization of a function call from the second event tracking protocol; and
    refraining from indicating that the first event tracking protocol is initialized until the status indicates that initialization of the function call is complete.

4. The method of claim 1, further comprising:
    checking whether the ad creative includes a function call to the second event tracking protocol;
    initializing the second event tracking protocol when the ad creative includes the function call; and
    playing the video ad without initializing the second event tracking protocol when the ad creative does not include the function call.

5. The method of claim 1, further comprising:
    checking whether the ad creative includes a function call to the second event tracking protocol;
    initializing the second event tracking protocol when the ad creative includes the function call; and
    refraining from playing the video ad when the ad creative does not include the function call.

6. An apparatus for playing a video advertisement, comprising:

a memory storing code; and
a processor configured to execute the code stored in the memory and to act as:
a first control module that controls initialization and operation of a first application programmer's interface (API) according to a first event tracking protocol comprising a mobile rich media ad interface definition (MRAID) protocol for generating video advertisement playback information when the video advertisement is played out in an application;
a second control module that controls selective initialization and operation of a second API according to a second event tracking protocol comprising a video player ad serving interface definition (VPAID) protocol for generating video advertisement playback information when the video advertisement is played out in-line with a video player such that the VPAID protocol finishes initialization prior to the MRAID protocol finishing initialization;
a container module that processes an ad creative accompanying the video advertisement;
wherein initialization of the first API according to the first event tracking protocol and selective initialization of the second API according to the second event tracking protocol are implemented to (i) interact with the first event tracking protocol to track inline video behavior that the second event tracking protocol is not configured to track and (ii) interact with the second event tracking protocol to communicate the inline video behavior to a computing device, wherein the first event tracking protocol is not configured to communicate inline video behaviors; and
a reporting module that transmits information, associated with the video advertisement, to at least one computing device.

7. The apparatus of claim 6, wherein selectively initializing the second event tracking protocol comprises initializing a subset of all functions of the second event tracking protocol due to initializing the first event tracking protocol.

8. The apparatus of claim 6, wherein the first control module that initializes the first event tracking protocol comprises:
a first module for checking a status of completion of initialization of a function call from the second event tracking protocol; and
a second module for refraining from indicating that the first event tracking protocol is initialized until the status indicates that initialization of the function call is complete.

9. The apparatus of claim 6, wherein the processor is further configured to act as:
a first module for checking whether the ad creative includes a function call to the second event tracking protocol;
a second module for initializing the second event tracking protocol when the ad creative includes the function call; and
a third module for playing the video advertisement without initializing the second event tracking protocol when the ad creative does not include the function call.

10. The apparatus of claim 6, wherein the processor is further configured to act as:

a first module for checking whether the ad creative includes a function call to the second event tracking protocol;
a second module for initializing the second event tracking protocol when the ad creative includes the function call; and
a third module for refraining from playing the video advertisement when the ad creative does not include the function call.

11. A computer program product comprising a computer-readable medium having code stored thereupon, the code comprising computer-executable instructions for a processor to perform a method of presenting video advertisements, comprising:
receiving an ad creative and a video ad defined by the ad creative;
playing the video ad by:
initializing a first event tracking protocol comprising a mobile rich media ad interface definition (MRAID) protocol for interfacing with an application within which the video ad is being served; and
selectively initializing a second event tracking protocol comprising a video player ad serving interface definition (VPAID) protocol for interfacing with a video player application used for in-line playing of the video ad such that the VPAID protocol finishes initialization prior to the MRAID protocol finishing initialization;
wherein initialization of the first event tracking protocol and selective initialization of the second event tracking protocol are implemented at least in part via a Software Developer's Kit (SDK) container to (i) interact with the first event tracking protocol to track inline video behavior that the second event tracking protocol is not configured to track and (ii) interact with the second event tracking protocol to communicate the inline video behavior to a computing device; and
transmitting information, associated with the playing, to at least one computing device.

12. The computer program product of claim 11, wherein the selective initialization of the second event tracking protocol provides for tracking of one or more accelerometers of a mobile device while also providing tracking of second inline video behavior provided by the first event tracking protocol while the video ad is displayed on the mobile device.

13. The apparatus of claim 6, wherein the apparatus is a mobile device and wherein the selective initialization of the second API according to the second event tracking protocol provides for tracking of one or more accelerometers of the mobile device while also providing tracking of second inline video behavior provided by the first event tracking protocol while the video advertisement is displayed on the mobile device.

14. The computer-implemented method of claim 1, wherein the user device is a mobile device and wherein the selective initialization of the second event tracking protocol provides for tracking of one or more accelerometers of the mobile device while also providing tracking of second inline video behavior provided by the first event tracking protocol while the video ad is displayed on the mobile device.

* * * * *